(12) United States Patent
Aydin et al.

(10) Patent No.: US 12,354,124 B2
(45) Date of Patent: *Jul. 8, 2025

(54) CUSTOMER CLUSTERING USING INTEGER PROGRAMMING

(71) Applicant: Transform SR Brands LLC, Hoffman Estates, IL (US)

(72) Inventors: Burcu Aydin, Mountain View, CA (US); Michael Tamir, San Jose, CA (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,613

(22) Filed: Nov. 1, 2023

(65) Prior Publication Data

US 2024/0070694 A1 Feb. 29, 2024

Related U.S. Application Data

(63) Continuation of application No. 17/705,483, filed on Mar. 28, 2022, now Pat. No. 11,823,218, which is a continuation of application No. 16/366,542, filed on Mar. 27, 2019, now Pat. No. 11,288,688, which is a continuation of application No. 14/084,903, filed on Nov. 20, 2013, now abandoned.

(51) Int. Cl.
*G06Q 30/0204* (2023.01)
*G06Q 30/0251* (2023.01)

(52) U.S. Cl.
CPC ..... *G06Q 30/0204* (2013.01); *G06Q 30/0251* (2013.01)

(58) Field of Classification Search
None
See application file for complete search history.

(56) References Cited

U.S. PATENT DOCUMENTS

| | | | |
|---|---|---|---|
| 7,308,418 B2 | 12/2007 | Malek et al. | |
| 7,610,255 B2 | 10/2009 | Willcock | |
| 7,672,865 B2 | 3/2010 | Kumar et al. | |
| 7,835,940 B2 | 11/2010 | Kowalchuk | |
| 8,296,182 B2 | 10/2012 | Chari et al. | |
| 8,301,482 B2 | 10/2012 | Reynolds et al. | |

(Continued)

FOREIGN PATENT DOCUMENTS

| | | | | |
|---|---|---|---|---|
| WO | WO-2005036319 A2 * | 4/2005 | ............. | G06Q 30/02 |
| WO | WO-2007127296 A2 * | 11/2007 | ........ | G06F 17/30592 |

OTHER PUBLICATIONS

Hsu et al "Segmenting customers by transaction data with concept hierarchy", Dec. 2011, Experts Systems with Applications, pp. 6221-6228 (Year: 2011).*

Ho et al "Customer grouping for better resources allocation using GA based clustering technique", Feb. 2012, Expert Systems with Applications vol. 39, Issue 2, 1, pp. 1979-1987 (Year: 2012).*

(Continued)

*Primary Examiner* — Romain Jeanty

(74) *Attorney, Agent, or Firm* — McAndrews, Held & Malloy, Ltd.

(57) ABSTRACT

Methods and apparatus are disclosed regarding an e-commerce system that clusters customers based on demographic data and purchase history data for the customers. In some embodiments, the e-commerce system solves an Integer Program that accounts for the demographic data and purchase history data in order to identify a hyperplane that splits a selected cluster of customers.

20 Claims, 11 Drawing Sheets

(56) References Cited

U.S. PATENT DOCUMENTS

| | | | |
|---|---|---|---|
| 8,452,652 B2 | 5/2013 | Barik et al. | |
| 8,626,618 B2 | 1/2014 | Psota et al. | |
| 2002/0143612 A1 | 10/2002 | Barik et al. | |
| 2003/0033194 A1 | 2/2003 | Ferguson et al. | |
| 2004/0064351 A1 | 4/2004 | Mikurak | |
| 2008/0082399 A1* | 4/2008 | Noble | G06Q 30/0204 |
| | | | 705/7.29 |
| 2010/0114665 A1* | 5/2010 | Stengard | G06F 16/214 |
| | | | 715/764 |
| 2010/0262464 A1 | 10/2010 | Monteforte et al. | |
| 2012/0116875 A1 | 5/2012 | Wang et al. | |
| 2013/0073390 A1 | 3/2013 | Konig et al. | |
| 2013/0117086 A1 | 5/2013 | Mesaros | |
| 2013/0132238 A1 | 5/2013 | Evans et al. | |
| 2013/0325548 A1 | 12/2013 | Kulkarni et al. | |
| 2013/0325681 A1 | 12/2013 | Somashekar et al. | |
| 2014/0052496 A1 | 2/2014 | Diana et al. | |
| 2014/0089044 A1* | 3/2014 | Nipko | G06Q 30/0204 |
| | | | 705/7.31 |
| 2014/0244641 A1* | 8/2014 | Patterson | G06F 16/9535 |
| | | | 707/737 |
| 2019/0147467 A1 | 5/2019 | Hawkins et al. | |

OTHER PUBLICATIONS

"Cluster Analysis", Wikipedia, dated Nov. 12, 2013, 19 pages.
"Cross-Validation (statistics)", Wikipedia, dated Nov. 12, 2013, 6 pages.
"K-Medoids", Wikipedia, dated Nov. 12, 2013, 7 pages.
"Logisic Regression", Wikipedia, dated Nov. 12, 2013, 18 pages.
"Maximum Likelihood", Wikipedia, dated Nov. 12, 2013, 14 pages.
"Principal Component Analysis", Wikipedia, dated Nov. 12, 2013, 16 pages.
"Silhouette (Clustering)", Wikipedia, dated Nov. 12, 2013, 2 pages.
"Support Vector Machine", Wikipedia, dated Nov. 12, 2013, 14 pages.
"Correlation and Dependence", Wikipedia, dated Nov. 14, 2013, 9 pages.
Integer Programming, Wikipedia, dated Nov. 14, 2013, 6 pages.
"Jaccard Index", Wikipedia, dated Nov. 14, 2013, 5 pages.
"Minkowski Distance", Wikipedia, dated Nov. 14, 2013, 2 pages.
Duen-Ren "Hybrid approaches to product recommendation based on customer lifetime value and purchase preferences", Dec. 2005, The Journal of Systems and Software 77, pp. 181-191 (Year: 2005).
Tae Hyup Roh (Collaborative filtering recommendation based on SOM cluster-indexing CBR), Dec. 2003 Expert Systems with Applications 25, pp. 413-423.

* cited by examiner

| Customer ID | Item ID | Transaction Date | Transaction Location | Quantity | Price |
|---|---|---|---|---|---|
| 100001 | 001 | 1/1/2013 | San Jose Sears | 1 | 10$ |

Fig. 6

| Customer ID | Category ID | Quantity |
|---|---|---|
| 100001 | 001 | 1 |
| 100001 | 001 | 2 |
| 100001 | 002 | 1 |

Fig. 7

| Customer ID | Category ID | Quantity |
|---|---|---|
| 100001 | 001 | 3 |
| 100001 | 002 | 1 |

Fig. 8

| 1 | 0 | 0 | 2 | 0 | 1 | 8 |
|---|---|---|---|---|---|---|

Fig. 9

| Units | Occurrence | Cumulative Occurrence | Quantile |
|---|---|---|---|
| 1 | 2 | 2 | 0.50 |
| 2 | 1 | 3 | 0.75 |
| 8 | 1 | 4 | 1.00 |

Fig. 10

| 0.50 | 0 | 0 | 0.75 | 0 | 0.50 | 1.00 |
|---|---|---|---|---|---|---|

Fig. 11

CUSTOMER CLUSTERING USING INTEGER PROGRAMMING

CLAIM OF BENEFIT

This patent application is a continuation of U.S. patent application Ser. No. 17/705,483, filed Mar. 28, 2022, which is a continuation of U.S. patent application Ser. No. 16/366,542, filed Mar. 27, 2019 (U.S. Pat. No. 11,288,688), which is a continuation of U.S. patent application Ser. No. 14/084,903, filed on Nov. 20, 2013, now abandoned. The above identified applications are hereby incorporated herein by reference in their entireties.

FIELD OF THE INVENTION

Various embodiments relate to electronic commerce (e-commerce), and more particularly, to classifying customers in an e-commerce environment.

BACKGROUND OF THE INVENTION

Electronic commerce (e-commerce) websites are an increasingly popular venue for consumers to research and purchase products without physically visiting a conventional brick-and-mortar retail store. An e-commerce website may provide products and/or services to a vast number of customers. As a result of providing such products and/or services, the e-commerce website may obtain extensive amounts of data about their customer base. Such customer data may aid the e-commerce website to provide products and/or services that are relevant and/or otherwise desirable to a particular customer.

In particular, an e-commerce website may attempt to identify groups of customers with similar interests or similar lifestyles. The e-commerce website may analyze these identified groups to derive generalizations regarding members of the group. The e-commerce website may then tailor its services to members of each group based upon the derived generalizations.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Apparatus and methods of classifying or grouping customers are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6 shows an example entry of the purchase history data for the e-commerce system of FIG. 1.

FIG. 7 shows an example purchase history table for the e-commerce system of FIG. 1 after evaluating and retaining data of the purchase history data for a time window of interest.

FIG. 8 shows an example purchase history table for the e-commerce system of FIG. 1 after combining rows that correspond to the same customer and product category.

FIG. 9 shows an entry from an example customer-item (CI) matrix for the e-commerce system of FIG. 1.

FIG. 10 shows an example quantile table for the e-commerce system of FIG. 1.

FIG. 11 shows a standardized entry from the example quantile table of FIG. 10.

DETAILED DESCRIPTION OF THE INVENTION

Aspects of the present invention are related to classifying and/or grouping customers together that exhibit similar interests, lifestyles, and/or purchase behavior. More specifically, certain embodiments of the present invention relate to apparatus, hardware and/or software systems, and associated methods that cluster customers based on solving an Integer Program that accounts for purchase history data and demographic data of the customers.

Figure 1:
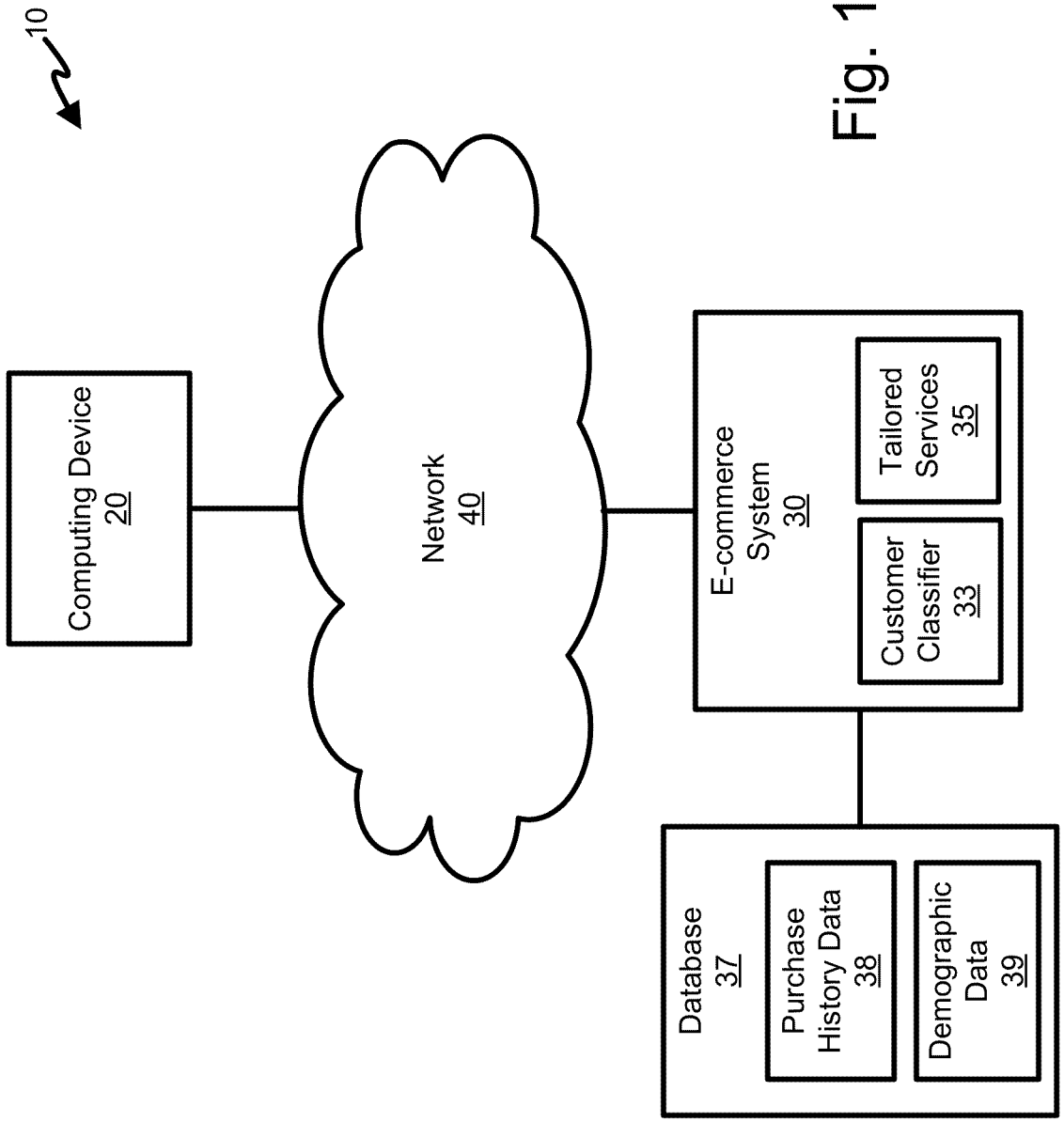
FIG. 1 shows an e-commerce environment comprising a computing device and an e-commerce system in accordance with an embodiment of the present invention.

Referring now to FIG. 1, an e-commerce environment 10 is depicted. As shown, the e-commerce environment 10 may include a computing device 20 connected to an e-commerce system 30 via a network 40. The network 40 may include a number of private and/or public networks such as, for example, wireless and/or wired LAN networks, cellular networks, and the Internet that collectively provide a communication path and/or paths between the computing device 20 and the e-commerce system 30. The computing device 20 may include a desktop, a laptop, a tablet, a smart phone, and/or some other type of computing device which enables a user to communicate with the e-commerce system 30 via the network 40. The e-commerce system 30 may include one or more web servers, database servers, routers, load balancers, and/or other computing and/or networking devices that operate to provide an e-commerce experience for users that connect to the e-commerce system 30 via the computing device 20 and the network 40.

The e-commerce system 30 may further include a customer classifier 33, one or more tailored services 35, and one or more electronic databases 37 upon which are stored purchase history data 38 and demographic data 39 for customers of the e-commerce system 30. The classifier 33 may include one or more firmware and/or software instructions, routines, modules, etc. that the e-commerce system 30 may execute in order to classify, group, or cluster customers of the e-commerce system 30 into classes, groups, or clusters of customers that exhibit similar purchasing habits. The classifier 33 may analyze purchase history data and demographic data for the customers to identify clusters of customers with similar purchasing preferences.

The tailored services 35 may comprise one or more firmware and/or software instructions, routines, modules, etc. that the e-commerce system 30 may execute in order to tailor one or more aspects of the e-commerce system 30 for a particular customer. The tailored services 35 may include advertisements, promotions, product recommendations, email campaigns, etc. that are tailored based upon the cluster to which the customer has been placed.

The classifier 33 and tailored services 35 may be executed concurrently by a single computing device of the e-commerce system 30. However, in some embodiments, a computing device may execute the classifier 33 offline in order to obtain appropriate clusters and other input data for the tailored services 35. Moreover, the classifier 33 may periodically (e.g., once an hour, once a day, once a week, etc.) provide one or more of the tailored services 35 with updated cluster and other input data. In this manner, the e-commerce system 30 may continue to provide tailored services 35 without the constant overhead of the classifier 33 and/or without the overhead of constant updates. For example, the e-commerce system 30 may execute the classifier 33 only during generally idle periods (e.g., after normal business hours). Further details regarding the classifier 33 and the tailored services 35 are presented below in regard to FIGS. 5-11.

FIG. 1 depicts a simplified embodiment of the e-commerce environment 10 which may be implemented in numerous different manners using a wide range of different computing devices, platforms, networks, etc. Moreover, while aspects of the e-commerce environment 10 may be implemented using a client/server architecture, aspects of the e-commerce may be implemented using a peer-to-peer architecture or another networking architecture.

Figure 2:
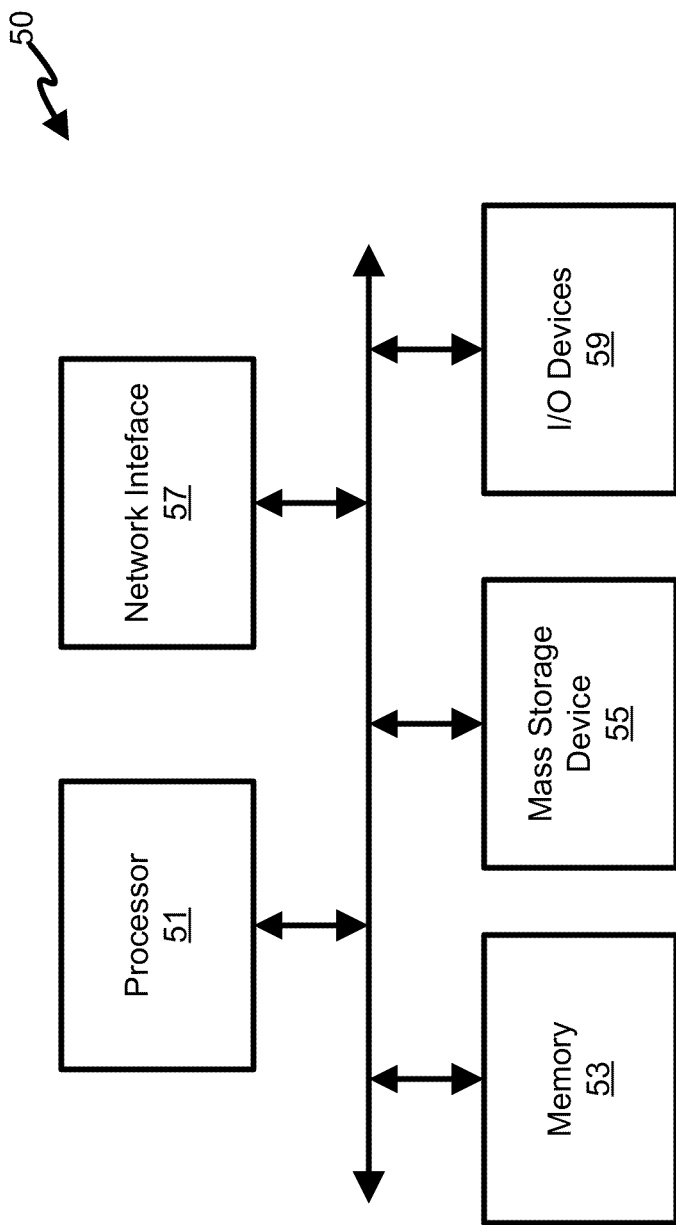
FIG. 2 shows an embodiment of a computing device for use in the e-commerce environment of FIG. 1.

As noted above, the e-commerce system 30 may include one or more computing devices. FIG. 2 depicts an embodiment of a computing device 50 suitable for the computing device 20 and/or the e-commerce system 30. As shown, the computing device 50 may include a processor 51, a memory 53, a mass storage device 55, a network interface 57, and various input/output (I/O) devices 59. The processor 51 may be configured to execute instructions, manipulate data and generally control operation of other components of the computing device 50 as a result of its execution. To this end, the processor 51 may include a general purpose processor such as an x86 processor or an ARM processor which are available from various vendors. However, the processor 51 may also be implemented using an application specific processor and/or other logic circuitry.

The memory 53 may store instructions and/or data to be executed and/or otherwise accessed by the processor 51. In some embodiments, the memory 53 may be completely and/or partially integrated with the processor 51.

In general, the mass storage device 55 may store software and/or firmware instructions which may be loaded in memory 53 and executed by processor 51. The mass storage device 55 may further store various types of data which the processor 51 may access, modify, and/or otherwise manipulate in response to executing instructions from memory 53. To this end, the mass storage device 55 may comprise one or more redundant array of independent disks (RAID) devices, traditional hard disk drives (HDD), solid-state device (SSD) drives, flash memory devices, read only memory (ROM) devices, etc.

The network interface 57 may enable the computing device 50 to communicate with other computing devices directly and/or via network 40. To this end, the networking interface 57 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc.), and/or some other type of networking interface capable of providing a communications link between the computing device 50 and network 40 and/or another computing device.

Finally, the I/O devices 59 may generally provide devices which enable a user to interact with the computing device 50 by either receiving information from the computing device 50 and/or providing information to the computing device 50. For example, the I/O devices 59 may include display screens, keyboards, mice, touch screens, microphones, audio speakers, etc.

While the above provides general aspects of a computing device 50, those skilled in the art readily appreciate that there may be significant variation in actual implementations of a computing device. For example, a smart phone implementation of a computing device may use vastly different components and may have a vastly different architecture than a database server implementation of a computing device. However, despite such differences, computing devices generally include processors that execute software and/or firmware instructions in order to implement various functionality. As such, aspects of the present application may find utility across a vast array of different computing devices and the intention is not to limit the scope of the present application to a specific computing device and/or computing platform beyond any such limits that may be found in the appended claims.

Figure 3:
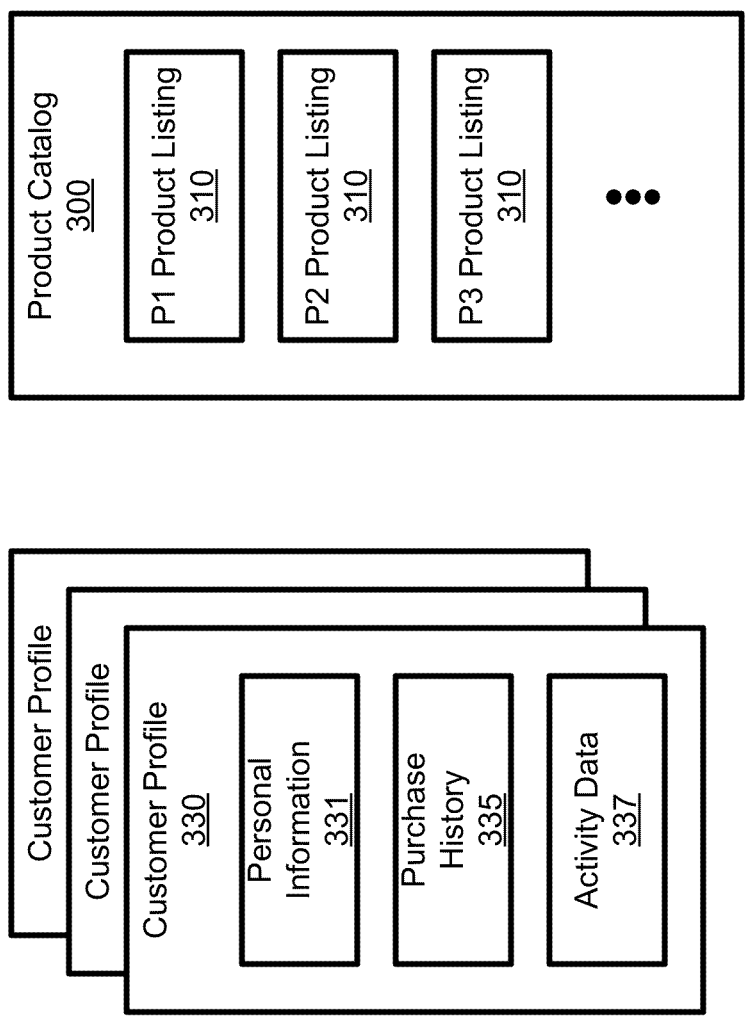
FIG. 3 shows user profiles and product catalogs maintained by an e-commerce system of FIG. 1.

As part of the provided e-commerce experience, the e-commerce system 30 may enable customers, which may be guests or members of the e-commerce system 30, to browse and/or otherwise locate products. The e-commerce system 30 may further enable such customers to purchase products offered for sale. To this end, the e-commerce system 30 may maintain an electronic product database or product catalog 300 which may be stored on an associated mass storage device 55. As shown in FIG. 3, the product catalog 300 includes product listings 310 for each product available for purchase. Each product listing 310 may include various information or attributes regarding the respective product, such as a unique product identifier (e.g., stock-keeping unit "SKU"), a product description, product image(s), manufacture information, available quantity, price, product features, etc. Moreover, while the e-commerce system 30 may enable guests to purchase products without registering and/or otherwise signing-up for a membership, the e-commerce system 30 may provide additional and/or enhanced functionality to those users that become a member.

To this end, the e-commerce system 30 may enable members to create a customer profile 330. As shown, a customer profile 330 may include personal information 331, purchase history data 335, and other customer activity data 337. The personal information 331 may include such items as name, mailing address, email address, phone number, billing information, clothing sizes, birthdates of friends and family, etc. The purchase history data 335 may include information regarding products previously purchased by the customer from the e-commerce system 30. The customer history data 335 may further include products previously purchased from affiliated online and brick-and-mortar vendors.

The other customer activity data 337 may include information regarding prior customer activities such as products for which the customer has previously searched, products for which the customer has previously viewed, products for which the customer has provide comments, products for which the customer has rated, products for which the customer has written reviews, etc. and/or purchased from the e-commerce system 30. The other customer activity data 337 may further include similar activities associated with affiliated online and brick-and-mortar vendors.

Figure 4:
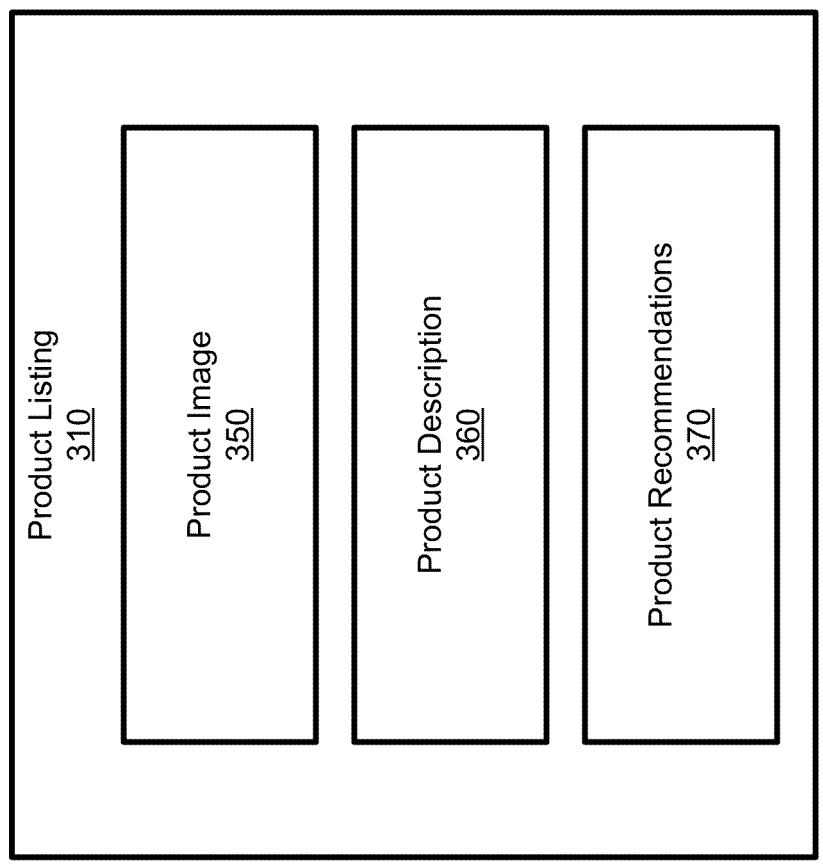
FIG. 4 shows an embodiment of a product listing provided by the e-commerce system of FIG. 1.

As part of the e-commerce experience, the e-commerce system 30 may cause a computing device 10 to display a product listing 310 as shown in FIG. 4. In particular, the e-commerce system 30 may provide such a product listing 310 in response to a member browsing products by type, price, kind, etc., viewing a list of products obtained from a product search, and/or other techniques supported by the e-commerce system 30 for locating products of interest. As shown, the product listing 310 may include one or more representative images 350 of the product as well as a product description 360. The product listing 310 may further include one or more products 370 recommended by a recommendation engine of the tailored services 35. In particular, the recommendation engine may provide product recommendations based on the personal information 331, purchase history data 335 and/or activity data 337.

Figure 5:
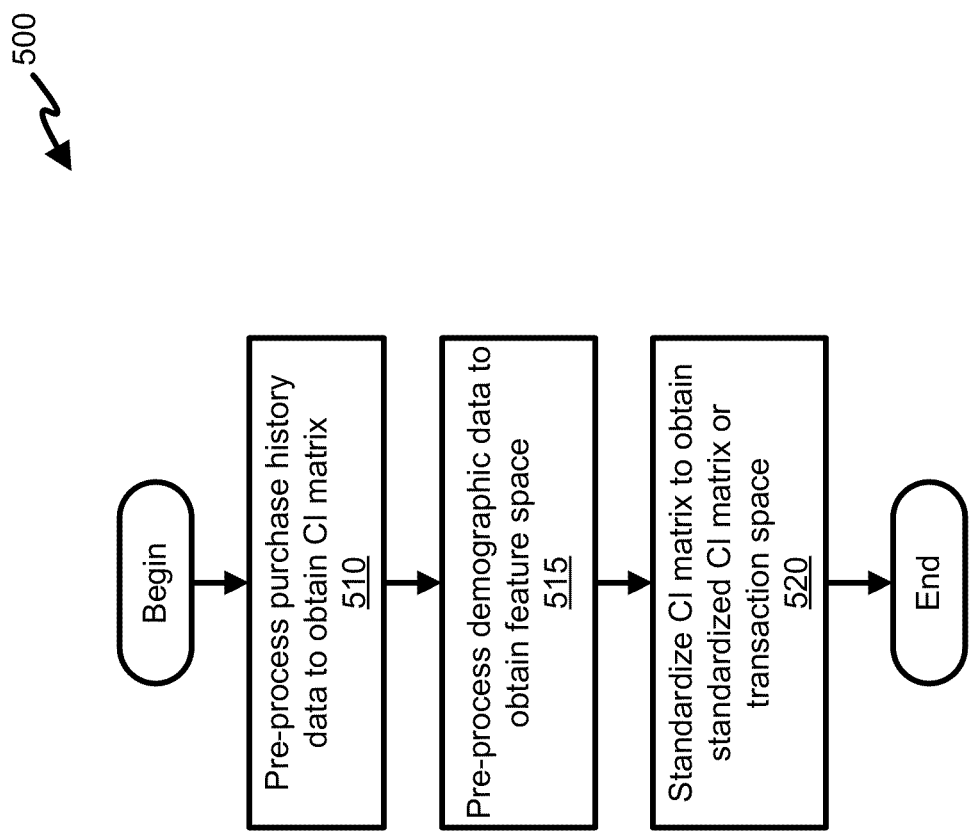
FIG. 5 shows a flowchart for an embodiment of a process that may be used by the e-commerce system of FIG. 1 to obtain a transaction space and a feature space from purchase history data and demographic data.

Referring now to FIG. 5, an example method 500 that may be implemented by the classifier 33 of the e-commerce system 30 is shown. In general, the classifier 33 in accordance with the method 500 respectively transforms the purchase history data and demographic data into a transaction space and feature space which the classifier 33 may use to partition or cluster the customer base as shown and discussed below in regard to FIG. 6. To this end, the classifier 33 at 510 may preprocess purchase history data 335 to obtain a Customer-Item (CI) matrix. The e-commerce system 30 may collect and maintain purchase history data 335 for the customer over a period of time. The purchase history data, in its raw form, may include information recorded for each purchase. An example entry is shown in FIG. 6. As shown, the e-commerce system 30 may maintain the purchase history data 335 in one or more relational database tables. Each row of the purchase history table may include a row for each transaction, and each row may include a customer identifier (ID) that uniquely identifies the customer associated with the corresponding transaction.

At 510, the classifier 33 may preprocess the raw purchase history information found in the purchase history table into a Customer-Item space. To this end, the classifier 33 may select a time window (e.g., the most recent 24 months). The classifier 33 may extract entries from the purchase history table that have a transaction date that falls within the selected time window. The classifier 33 may then discard all fields other than the Customer ID, Item ID and Quantity of that particular item purchased in that transaction.

Many e-commerce sites maintain a product hierarchy of product identifiers where the Item ID corresponds to the lowest level of such hierarchy and various Category IDs lie higher up in the product hierarchy. Moreover, in many environments, the Item IDs are at such a fine a granularity that correlations between purchases may be lost. In such situations, the classifier 33 may be configured to coalesce purchased items of multiple Item IDs under a single Category ID that lies at a high level in the product hierarchy.

FIG. 7 shows an example table after evaluating the time window as described above. As may be seen from FIG. 7, the resulting table may still include multiple entries or rows for each Customer ID and Category ID pair. The classifier 33 may apply a pivoting step to the resulting table in order to combine rows having the same Customer ID and Category ID pair into a single row. As shown in FIG. 8, the resulting table includes a single row for each Customer ID and Category ID pair and includes Quantity data that contains the sum of all purchased quantities for this ID pair.

From the table shown in FIG. 8, the classifier 33 may create a Customer-Item (CI) matrix. In the CI matrix, each row i corresponds to a unique Customer ID, each column j corresponds to a unique Category ID, and the entry $CI_{ij}$ corresponds to the quantity of this Customer ID and Category ID pair from the table shown in FIG. 7. If a particular customer did not purchase from a product in a category of CI matrix, then corresponding entry is zero.

At 515, the classifier 33 may further preprocess the demographic data of its customers to obtain a feature space. The e-commerce system 30 may collect demographic data from customers such as personal information 331 provided in the customers profile 330. The e-commerce system 30 may further obtain demographic data for customers from various providers of demographic data. Based on such collected demographic data, the classifier 33 may maintain and/or create a demographic table. The demographic table may include a row for each Customer ID. Moreover, each column of the table may represent a different feature such, as for example, age, gender, occupation, number of children, etc. During preprocessing, the classifier 33 may turn each demographic entry into a numerical value. For example, the "Gender" column may contain only two kinds of entries, male and female. The classifier 33 may preprocess the demographic table such that that Gender column includes a 1 for each female customer and a 0 otherwise. The preprocessed demographic table may form the feature space for later classification.

After preprocessing the purchase history and demographic data, the classifier 33 at 520 may standardize the CI matrix to obtain a standardized CI matrix which is referred to as transaction space. Standardizing the CI Matrix may ensure that the columns of the standardized CI matrix are scale-wise comparable with each other. In one embodiment, the classifier 33 applies standardization to each column separately using a bin quantiles standardization (BQS) technique. However, other standardization techniques may be utilized.

To illustrate the BQS technique, one example column of the CI matrix is shown in FIG. 9. If depicted column corresponds to a category ID CID in the CI matrix, then the information in column suggests that customer 1 bought 1 unit of an item corresponding to category ID, customer 4 bought 2 items, customer 6 bought 1 item, and customer 7 bought 8 items. The classifier 33 in accordance with the BQS technique may traverse the column, record every unique quantity except zero that appears along with how many times each unique quantity appears in the column. The classifier 33 may sort the results based on occurrence of each unique quantity. See, e.g., the Occurrences column of FIG. 10. The classifier 33 may traverse the occurrences to obtain a cumulative sum of the number of occurrences. See, e.g., Cumulative Occurrences column of FIG. 10. Furthermore, the classifier 33 for each row may divide the respective cumulative occurrence value by the last number in the cumulative occurrence column (i.e., the total number of occurrences) to obtain the quantile value for that row. See, e.g., Quantile column of FIG. 10.

The BQS result shown in FIG. 10 suggests that the customers who bought 1 item associated with the category ID constitute the first 50% quantile, customers who bought 2 or less such items are the 75% quantile, and customers who bought 8 or less such items are the 100% quantile. The classifier 33 may then update the quantity values of the original column with their corresponding quantile values as shown in FIG. 11 to obtain the standardized column.

The BQS technique may provide two advantages. One, all the numbers in the columns of CI matrix are guaranteed to be between 0 and 1, therefore the purchase patterns of high-frequency items such as grocery items and a low-frequency items such as expensive electronics items are comparable. Second, because the quantile values are thought in terms of frequencies of each number appearing and their relative order rather than their nominal values, the occasional very large number observed in the columns do not skew the analysis.

After obtaining feature space the standardized transaction spaces, the classifier 33 may classify or cluster the customers. In particular, the classifier 33 may attempt to find linear partitions in the feature space that divides the data points (customers) into groups or clusters with the smallest sum of distances within themselves. The distances are defined using the standardized transaction space.

The distance between customer A and customer B is a measure of the dissimilarity between their purchase history data 335. While many distance functions may be used, the classifier 33 in one embodiment uses the Minkowski distance for Euclidean space. The Minkowski distance for an integer p may be represented by the following expression:

$$\left(\sum_{i=1}^{n}\left|CI_A^i - CI_B^i\right|^p\right)^{1/p}$$

where $CI_A$ represents the row in the standardized CI matrix for the customer A; $CI_B$ represents the row in the standardized CI matrix for the customer B; $CI_A^i$ represents the $i^{th}$ element of row $CI_A$; $CI_B^i$ represents the $i^{th}$ element of row $CI_B$. The cases where p=1 and p=2 correspond to the Manhattan distance and Euclidean distance, respectively.

The classifier 33 may alternatively utilize a distance function that provides a metric of the similarity between customers. In such an embodiment, the classifier 33 may attempt to maximize the sum of inner-similarities per cluster. For example, the classifier 33 may use Jaccard similarity functions, correlation functions, and/or some other similarity function in such an embodiment.

After obtaining the feature space and transaction space, the classifier 33 may proceed to analyze the feature space and transaction space in order to identify clusters of customers with similar purchasing behaviors. To this end, the classifier 33 may iteratively divide customer sets into two partitions until a suitable number of partitions for the customer base is obtained. In particular, the classifier 33 may divide the feature space into two partitions that minimizes the inner-distance between members of the cluster in the transaction space by solving an Integer Program that takes into account both the feature space and transaction space of the customer base.

In one embodiment, the following parameters, data, variables, and formulation define a Integer Program which may be solved to obtain a hyperplane that suitably divides the customer base into two clusters.

Parameters and Data:
n=number of customers;
m=number of dimensions in feature space;
$x_i$=length-m coordinate vector of customer i in feature space for i=1 . . . n;
$d_{ij}$=distance between customers i and j in transaction space according to a pre-selected distance metric;
C=a large constant; and
ε=a small constant (epsilon).

Variables:
$I_i$=indicator variable of customer i, which is one if customer i is in cluster 1 (one side of the optimum hyperplane), and zero if the customer is in cluster 2 (the other side of the hyperplane) in the feature space.
$J_{ij}$=indicator variable for customer pair (i,j), which is equal to one if i and j are in the same cluster, and zero if they are in different clusters.
β=the length-m direction vector in feature space that defines the direction of the dividing hyperplane.
$β_0$=scalar intercept of the dividing hyperplane.

Formulation:
Minimize:

$$\sum_{i=1}^{n}\sum_{j=1}^{n}d_{ij}J_{ij}$$

Subject to:

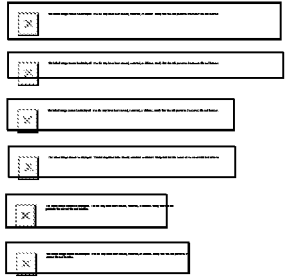

The above Integer Program, when solved by an Integer Programming solver of the classifier 33, returns the clustering of customers in the feature space together with hyperplane variables β and $β_0$ that define the division rule for the clusters. The classifier 33 may use the division rule to place new customers into one of the defined clusters based on known demographic features. By doing so, the classifier 33 may obtain some insight into the likely purchasing behavior for a new customer despite not having much or any purchase history data for the new customer.

Figure 12:
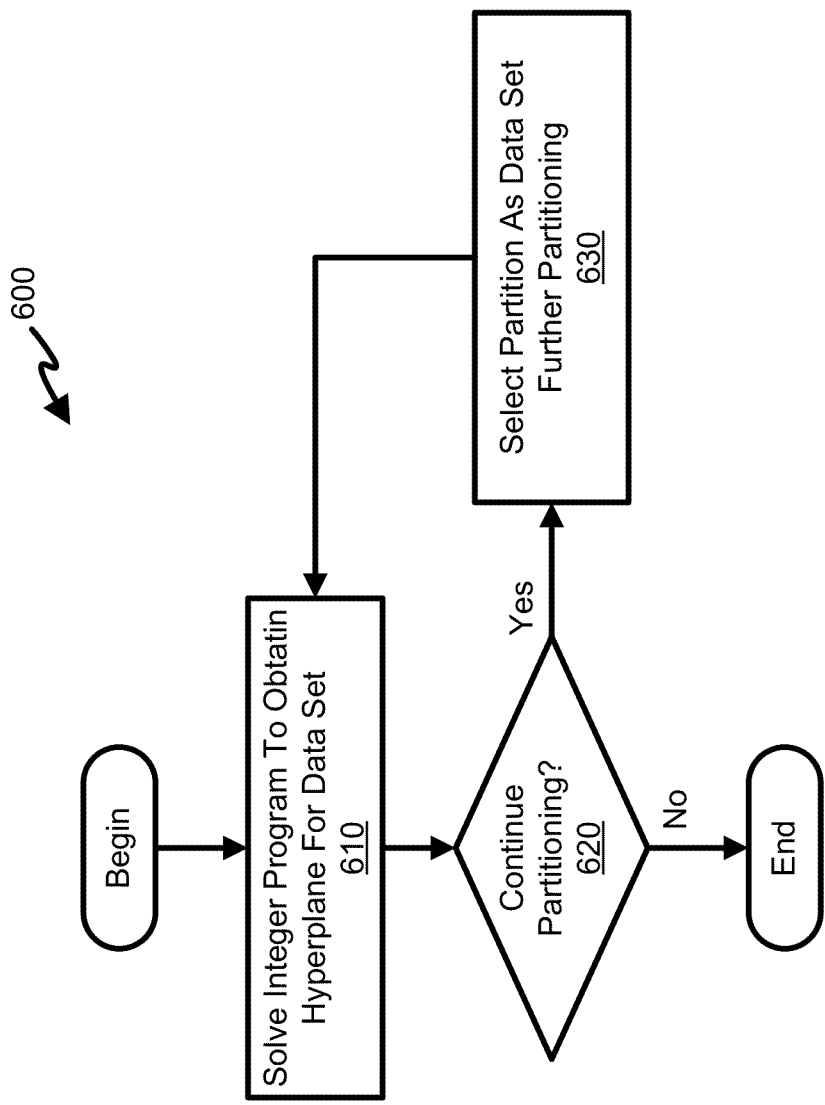
FIG. 12 shows a flowchart of a process that may be used by the e-commerce system of FIG. 1 to cluster customers based on the transaction space and feature space.

The above Integer Program, however, divides the customer base into only two clusters or partitions, which is most likely not enough number of clusters to provide meaningful insight into the purchasing behaviors of the customer base. Accordingly, the classifier 33 may iteratively apply the above Integer Program in order to further divide the clusters until a suitable number of clusters are obtained. Such an iterative clustering method 600 is shown in FIG. 12.

At 610, the classifier 33 at 610 may solve the above Integer Program to obtain a hyperplane that divides or partitions the customer base or data set into two partitions or clusters. After dividing the data set into two clusters, the classifier 33 at 620 may determine whether further partitioning of the data set is warranted. To this end, the classifier 33 may make such a determination based upon a stopping rule. A stopping rule may define conditions for stopping further partitioning of the data set and for identifying which cluster or clusters to further divide. A first example stopping rule may be to pre-define the desired number of clusters, and iteratively keep dividing the cluster with the largest population until the desired number of clusters is reached. A second example stopping rule may be to define the largest population to be allowed in a single cluster, and keep dividing the clusters that are more populated than this limit until no cluster exceeds this limit. It should be appreciated that the above two stopping rules are merely examples and that other stopping rules and/or a combination of rules may be used by the classifier 33 to ascertain whether to cease partitioning and/or selecting which clusters to further partition.

If the classifier 33 determines that no further partitioning is warranted, then the classifier 33 may cease further partitioning of the data set. However, if the classifier 33 determines that the stopping rules indicates further partitioning is warranted, then the classifier 33 at 630 may select a cluster for further partitioning based on the stopping rule. For example, the classifier 33 per the first example stopping rule may select the cluster having the largest population for further partitioning. If the second example stopping rule is being used, then the classifier 33 may select a cluster having a population greater than the predefined limit.

After selecting an appropriate cluster for further partitioning, the classifier 33 may return to 610 in order to solve the Integer Program and obtain a hyperplane that partitions the selected cluster into two smaller clusters. In this manner, the classifier 33 may continue to obtain further partitions until a suitable number of partitions is achieved per the stopping rule in effect.

Figure 14:
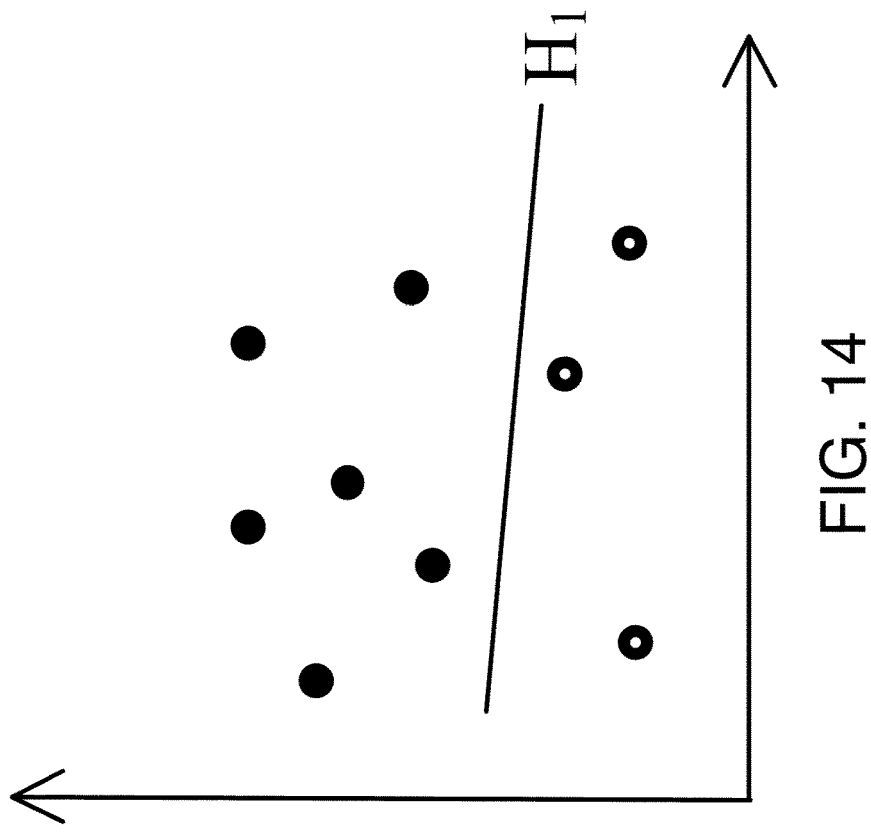
FIGS. 13-16 depict an example partitioning of a customer base.
Figure 13:
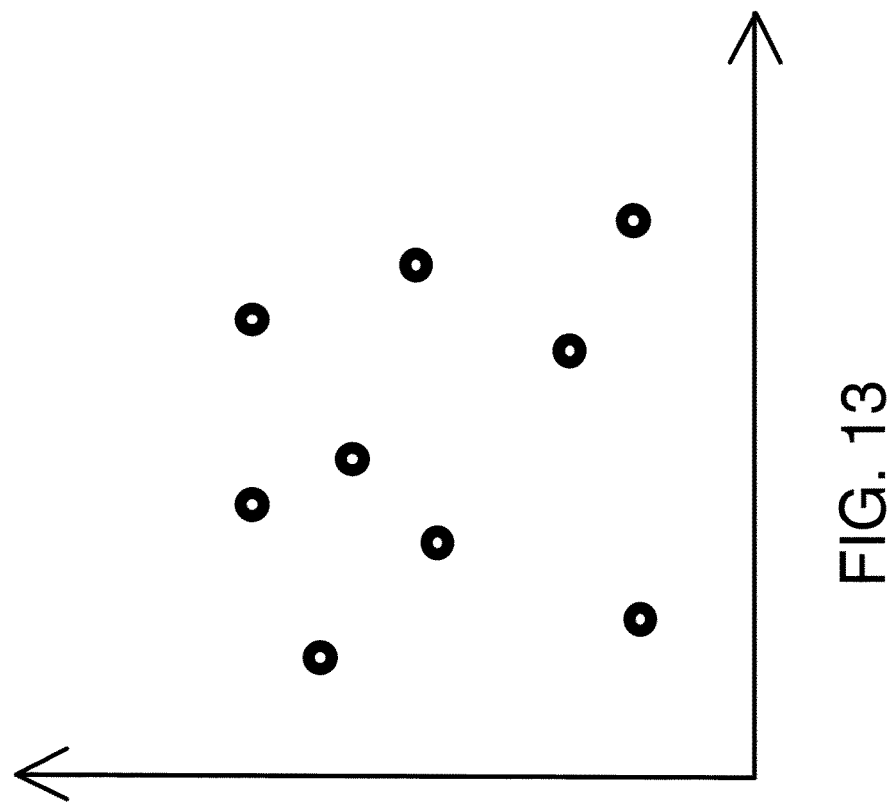
Figure 16:
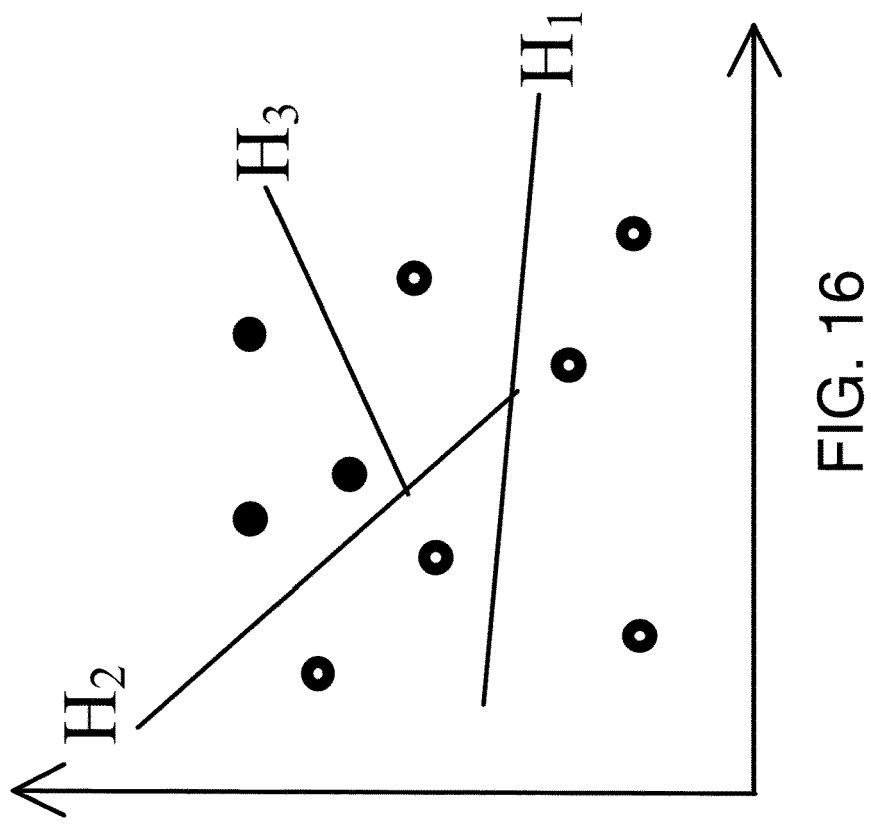

Referring now to FIGS. 13-16, an example of partitioning a data set of customers per the method 600 is shown. In particular, the example illustrates partitioning based on a stopping rule of the largest allowable cluster having a population of 3. Starting with FIG. 13, an unclustered data set of 9 customers in a two dimensional feature space is shown. FIG. 14 shows a hyperplane $H_1$ obtained by the classifier 33 as a result of solving the Integer Program in order to partition the 9 customers of FIG. 13. After such partitioning of FIG. 14, the lower partition has a data set of 3 customers and is thus not divided further per the stopping rule. The upper partition, however, defines a data set of 6 customers and thus exceeds the population limit of 3 for the stopping rule. As such, the classifier solves the Integer Program for the upper data set to obtain the hyperplane $H_2$ shown in FIG. 15.

Figure 15:
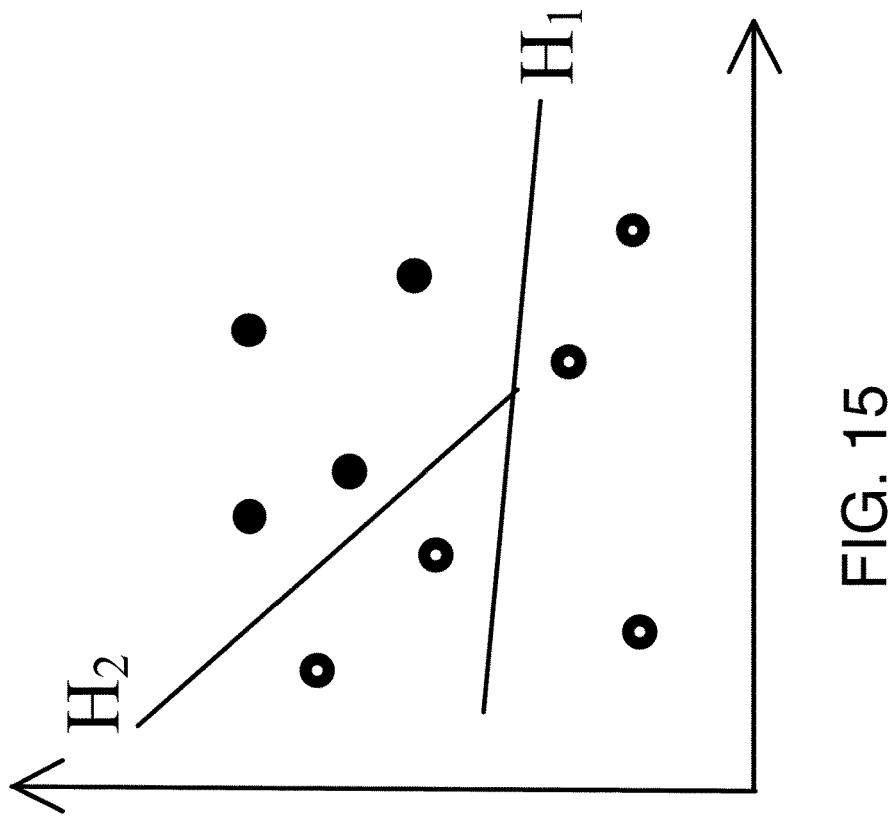

After such partitioning of FIG. 15, the upper left partition has a data set of 2 customers and is thus not divided further per the stopping rule. The upper right partition, however, defines a data set of 4 customers and thus still exceeds the population limit of 3 for the stopping rule. As such, the classifier solves the Integer Program for the upper right data set to obtain the hyperplane $H_3$ shown in FIG. 16. After such partitioning of FIG. 16, all partitions have less the than population limit of 3. As such, the classifier 33 ceases further partitioning of the customer base per the stopping rule.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a non-transitory, computer readable storage medium such as, for example, flash memory devices, hard disk devices, compact disc media, DVD media, EEPROMs, etc. Such instructions, when executed by one or more computing devices, may result in the one or more computing devices identifying customer clusters based on purchase history data and demographic data for the customer.

While the present invention has been described with reference to certain embodiments, it will be understood by those skilled in the art that various changes may be made and equivalents may be substituted without departing from the scope of the present invention. For example, the above embodiments were described primarily from the standpoint of an e-commerce environment. However, it should be appreciated that clustering of customers may be useful in other environments as well. For example, a brick-and-mortar store may cluster customers in order to provide targeted mailing, coupons, and/or other types of promotions to its customers. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method comprising:
   tailoring a service for a particular customer according to a customer cluster that comprises the particular customer, wherein the customer cluster is one of a plurality of customer clusters; and
   periodically updating the plurality of customer clusters to maximize inner-similarities among customers in each of the plurality of customer clusters, wherein the inner-similarities are determined according to purchase history data and demographic data;
   solving an integer program, via a classifier, to account for the purchase history data and the demographic data of a selected customer cluster; and
   iteratively dividing customer sets into two partitions, via the classifier, until a suitable number of partitions for a customer base is obtained.

2. The method of claim 1, wherein the service comprises providing product recommendations according to the customer cluster comprising the particular customer.

3. The method of claim 1, wherein the service comprises providing product promotions according to the customer cluster comprising the particular customer.

4. The method of claim 1, wherein the service comprises providing coupons according to the customer cluster comprising the particular customer.

5. The method of claim 1, wherein the inner-similarities are maximized according to one or more solutions of an integer program.

6. The method of claim 1, wherein updating the plurality of customer clusters comprises selecting a particular customer cluster that has a population greater than a specified limit and splitting the particular customer cluster.

7. The method of claim 1, wherein the method comprises storing the purchase history data in one or more relational database tables such that each row includes transaction data and a customer identifier that identifies a customer associated with the transaction data.

8. The method of claim 1, wherein updating the plurality of customer clusters comprises coalescing purchased items of multiple item identifiers under a single identifier and updating the plurality of customer clusters according to the purchased items under the single identifier.

9. The method of claim 1, wherein the plurality of customer clusters are updated according to a customer-item (CI) matrix, wherein:
each row of the CI matrix corresponds to a customer identifier,
each column of the CI matrix corresponds to a category identifier, and
each entry of the CI matrix corresponds to a quantity associated with one or more customer identifiers.

10. The method of claim 1, wherein the plurality of customer clusters are updated according to a customer-item (CI) matrix, and wherein each column of the CI matrix is standardized according to a bin quantiles standardization (BQS).

11. A system comprising:
one or more processors configured to:
tailor a service for a particular customer according to a customer cluster that comprises the particular customer, wherein the customer cluster is one of a plurality of customer clusters; and
periodically update the plurality of customer clusters to maximize inner-similarities among customers in each of the plurality of customer clusters, wherein the inner-similarities are determined according to purchase history data and demographic data; and
a classifier operable to:
solve an integer program to account for the purchase history data and the demographic data of a selected cluster; and
iteratively divide customer sets into two partitions until a suitable number of partitions for a customer base is obtained.

12. The system of claim 11, wherein the one or more processors are configured to provide product recommendations according to the customer cluster comprising the particular customer.

13. The system of claim 11, wherein the one or more processors are configured to provide product promotions according to the customer cluster comprising the particular customer.

14. The system of claim 11, wherein the one or more processors are configured to provide coupons according to the customer cluster comprising the particular customer.

15. The system of claim 11, wherein the one or more processors are configured to maximize the inner-similarities according to one or more solutions of an integer program.

16. The system of claim 11, wherein the one or more processors are configured to update the plurality of customer clusters by selecting a particular customer cluster that has a population greater than a specified limit and splitting the particular customer cluster.

17. The system of claim 11, wherein the system comprises one or more relational database tables for storing the purchase history data such that each row includes transaction data and a customer identifier that identifies a customer associated with the transaction data.

18. The system of claim 11, wherein the one or more processors are configured to coalesce purchased items of multiple item identifiers under a single identifier, and wherein the one or more processors are configured to update the plurality of customer clusters according to the purchased items under the single identifier.

19. The system of claim 11, wherein the one or more processors are configured to update the plurality of customer clusters according to a customer-item (CI) matrix, wherein:
each row of the CI matrix corresponds to a customer identifier,
each column of the CI matrix corresponds to a category identifier, and
each entry of the CI matrix corresponds to a quantity associated with one or more customer identifiers.

20. The system of claim 11, wherein the one or more processors are configured to update the plurality of customer clusters according to a customer-item (CI) matrix, and wherein each column of the CI matrix is standardized according to a bin quantiles standardization (BQS).

* * * * *